United States Patent
Kim et al.

(10) Patent No.: US 11,768,891 B2
(45) Date of Patent: Sep. 26, 2023

(54) METHOD FOR PROVIDING SCRAPING-BASED SERVICE AND APPLICATION FOR EXECUTING THE SAME

(71) Applicant: KakaoBank Corp., Seongnam-si (KR)

(72) Inventors: Dohyoung Keedi Kim, Seongnam-si (KR); Hyeon Seung Kim, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 0 days.

(21) Appl. No.: 17/790,992

(22) PCT Filed: Jan. 8, 2021

(86) PCT No.: PCT/KR2021/000258
§ 371 (c)(1),
(2) Date: Jul. 6, 2022

(87) PCT Pub. No.: WO2021/141441
PCT Pub. Date: Jul. 15, 2021

(65) Prior Publication Data
US 2023/0073190 A1    Mar. 9, 2023

(30) Foreign Application Priority Data
Jan. 9, 2020   (KR) .................. 10-2020-0003063

(51) Int. Cl.
*G06F 16/951*    (2019.01)
(52) U.S. Cl.
CPC .................. *G06F 16/951* (2019.01)

(58) Field of Classification Search
CPC ..................................... G06F 16/951
See application file for complete search history.

(56) References Cited

U.S. PATENT DOCUMENTS 7,627,658 B2 * 12/2009 Levett .................. G06F 9/46
709/248
10,237,256 B1 * 3/2019 Pena .................. H04L 63/0853
(Continued)

FOREIGN PATENT DOCUMENTS

| KR | 10-2017-0041523 A | 4/2017 |
| KR | 10-2018-0080535 A | 7/2018 |
| KR | 10-2197329 B1 | 12/2020 |

OTHER PUBLICATIONS

Notification of Reason for Refusal dated Jun. 19, 2020, issued in counterpart KR Patent Application No. 10-2020-0003063, w/English translation (15 pages).
(Continued)

*Primary Examiner* — Mark E Hershley
(74) *Attorney, Agent, or Firm* — WHDA, LLP

(57) ABSTRACT

The disclosure relates to a method for providing a scraping-based service. The method for providing a scraping-based service includes: requesting and receiving at least one of scraping rule information defining a series of tasks for obtaining external data; collecting the external data by executing tasks according to the received rule information; and providing service information to a user using the collected external data. According to the disclosure, by providing a scraping service through a client terminal and a remote server in a distributed manner, it is possible to increase efficiency of a scraping task and actively cope with changes in a scraping target.

12 Claims, 8 Drawing Sheets

(56) References Cited

U.S. PATENT DOCUMENTS

| | | | |
|---|---|---|---|
| 10,552,639 B1* | 2/2020 | Buzbee | G06F 21/6245 |
| 2007/0050191 A1* | 3/2007 | Weider | G10L 15/22 |
| | | | 704/E15.04 |
| 2009/0288169 A1 | 11/2009 | Petta et al. | |
| 2011/0258049 A1* | 10/2011 | Ramer | G06Q 30/0273 |
| | | | 705/14.69 |
| 2012/0089931 A1* | 4/2012 | Steinhauer | G06F 9/451 |
| | | | 715/764 |
| 2012/0151278 A1* | 6/2012 | Tsantilis | G06F 11/079 |
| | | | 714/48 |
| 2013/0061026 A1* | 3/2013 | Kaufmann | G06F 9/4843 |
| | | | 712/220 |
| 2014/0152461 A1* | 6/2014 | Carlson | G08C 19/00 |
| | | | 340/870.01 |
| 2014/0359415 A1 | 12/2014 | Song et al. | |
| 2015/0213134 A1* | 7/2015 | Nie | G06F 16/951 |
| | | | 707/770 |
| 2016/0099972 A1* | 4/2016 | Qureshi | H04L 67/10 |
| | | | 726/1 |
| 2017/0124481 A1* | 5/2017 | Crabtree | G06Q 10/0637 |
| 2017/0161439 A1* | 6/2017 | Raduchel | G16H 10/60 |
| 2017/0230414 A1* | 8/2017 | Kamble | H04L 63/101 |
| 2017/0255884 A1* | 9/2017 | Visvanathan | G06N 3/006 |
| 2017/0352027 A1* | 12/2017 | Zhang | G06Q 20/065 |
| 2019/0205810 A1* | 7/2019 | Pojar | H04L 51/046 |
| 2019/0332424 A1* | 10/2019 | Jeong | G06F 9/4881 |

OTHER PUBLICATIONS

Decision to Grant a Patent dated Dec. 22, 2020, issued in counterpart KR Patent Application No. 10-2020-0003063, w/English translation (4 pages).

International Search Report dated Apr. 8, 2021, issued in counterpart International Application No. PCT/KR2021/000258 (3 pages).

* cited by examiner

METHOD FOR PROVIDING SCRAPING-BASED SERVICE AND APPLICATION FOR EXECUTING THE SAME

TECHNICAL FIELD

The disclosure relates to a method for providing a scraping-based service.

BACKGROUND ART

Scraping is a technology for extracting data necessary for providing information among distributed data and providing the extracted data to a user, and allows information distributed in various places such as financial companies, public institutions, and government web sites to be integrated and referred to and managed using customer's authentication information.

Screen scraping, which is one of scraping methods, collects and provides data displayed on a screen through a display device, and is also called web scraping because it collects and provides information generally displayed on web sites or the like.

Scraping technologies have been mainly used in the field of managing assets and expenses of individuals distributed in the respective financial institutions, and have been used in order to integrate and manage service mileage or integrate and refer to e-mails and provide the e-mails to the user.

That is, when the scraping is used, there is an advantage that information distributed to the respective information management entities may be collected and managed.

An entity providing a service through the scraping needs to be individually and continuously cope with a change of an authentication method or system requirements in a web site where scraping target information is managed.

An application providing a service through conventional scraping has been operated in a manner of configuring a separate scraping module for each target web site in order to directly cope with changes in target web sites, continuously monitoring changes, and updating the scraping module according to a change in the target web site.

Such a change of the scraping module causes a problem that when a plurality of scraping target web sites exist in order to provide one service, the application should be modified and redistributed whenever there is a change of each web site.

A problem that the installed application should be reinstalled every time in order to use the service occurs, and thus, the user feels inconvenient in using the service.

Accordingly, in order to solve this problem, it is necessary to devise a method of providing a scraping-based service by actively coping with a change situation of a scraping target and minimizing the update of the application.

DISCLOSURE

Technical Problem

An object of the disclosure is to propose a method of efficiently providing a scraping service.

In more detail, an object of the disclosure is to propose a method of actively coping with a change of a scraping target entity and more efficiently executing a task for scraping.

In addition, an object of the disclosure is to distribute a method of configuring a library for a scraping service, and accordingly, decrease update or redistribution of a separate application.

Technical Solution

According to an aspect of the disclosure, a method for providing a scraping-based service includes: requesting and receiving at least one of scraping rule information defining a series of tasks for obtaining external data; collecting the external data by executing tasks according to the received rule information; and providing service information to a user using the collected external data.

In the collecting of the external data, the external data may be collected by executing a plurality of commands constituting the tasks defined in the rule information on a client terminal or a remote server.

The task may include a combination of local commands executed on the client terminal and generated in advance.

The task may further include a customized remote command executed on the remote server.

The client terminal may transmit a remote procedure call to the remote server in order to execute the remote command, and The remote server may return an execution result of the task executed according to the remote procedure call to the client terminal.

In the collecting of the external data, an execution result of the executed task may be verified for execution of each task, and Modification of the rule information or a remote procedure call for the command may be requested when there is an abnormality in the execution of the task.

When the remote commands are continuous a predetermined number of times or more according to an execution schedule of the task, The client terminal may provide a control right for controlling command execution to the remote server, and receive a return of an execution result of the remote commands continuously executed and the control right from the remote server that has received the control right.

The tasks may be executed in block units, such that execution results of commands in the tasks are stored in blocks, and Execution results of the tasks may be referenced using task names and related variables at the time of referencing the tasks.

The local command and the remote command may be executed in a distributed manner through the client terminal or the remote server, and The task may be asynchronously polled.

According to another aspect of the disclosure, an application for providing a scraping-based service includes: a scraping rule requester configured to request and receive at least one of scraping rule information defining a series of tasks for obtaining external data; a task executor configured to collect the external data by executing tasks according to the received rule information; and a service provider configured to provide service information to a user using the collected external data.

The task executor may be configured to collect the external data by executing a plurality of commands constituting the tasks defined in the rule information on a client terminal or a remote server.

The task executor may further include: a remote procedure call (RPC) transmitter configured to transmit a remote procedure call to the remote server in order to execute the remote command; and A command result receiver configured to receive a return of an execution result of the task executed according to the remote procedure call from the remote server.

According to still another aspect of the disclosure, a scraping-based service remote providing method includes: managing scraping rule information defining a series of tasks for obtaining external data and transmitting the rule information according to a request from a client terminal; executing a remote command that needs to be remotely executed while the client terminal executes tasks defined in the transmitted rule information, according to a remote procedure call; and returning an execution result of the remote command to the client terminal.

In the executing of the remote command, when the remote commands are continuous a predetermined number of times or more according to an execution schedule of the task, a control right for controlling command execution may be received from the client terminal, and the remote commands may be continuously executed.

In the returning of the execution result, an execution result of the remote commands continuously executed in the remote server that has received the control right and the control right may be returned.

According to yet still another aspect of the disclosure, a remote server for providing a scraping-based service includes: a rule server configured to manage scraping rule information defining a series of tasks for obtaining external data and transmit the rule information according to a request from a client terminal; and a command server configured to execute a command that needs to be remotely executed while the client terminal executes tasks defined in the transmitted rule information, according to a remote procedure call, and return an execution result of the command.

The command server may receive a control right for controlling command execution from the client terminal and continuously execute the remote commands, when the remote commands are continuous a predetermined number of times or more according to an execution schedule of the task.

The command server may return an execution result of the remote commands continuously executed in the remote server that has received the control right and the control right.

Advantageous Effects

According to the disclosure, by providing a scraping service through the client terminal and the remote server in a distributed manner, it is possible to increase efficiency of a scraping task and actively cope with changes in a scraping target.

In addition, it is possible to increase use convenience of the user by minimizing update or redistribution of an application in response to the change of the scraping target.

Further, it is possible to increase security by operating the remote server executing scraping independently from the client terminal and prevent external access to and leakage of information used for executing the scraping.

BEST MODE FOR INVENTION

The following description exemplifies only a principle of the disclosure. Therefore, those skilled in the art may invent various apparatuses implementing the principle of the disclosure and included in the spirit and scope of the disclosure although not explicitly described or illustrated herein. In addition, it is to be understood that all conditional terms and embodiments mentioned herein are obviously intended only to allow those skilled in the art to understand a concept of the disclosure in principle, and the disclosure is not limited to embodiments and states particularly mentioned as such.

The objects, features, and advantages described above will become more obvious from the following detailed description provided in relation to the accompanying drawings, and accordingly, those skilled in the art to which the disclosure pertains may easily practice the technical spirit of the disclosure.

In addition, in describing the disclosure, when it is determined that a detailed description of a known technology related to the disclosure may unnecessarily obscure the gist of the disclosure, the detailed description will be omitted. Hereinafter, an embodiment of the disclosure will be described in detail with reference to the accompanying drawings.

Figure 1:
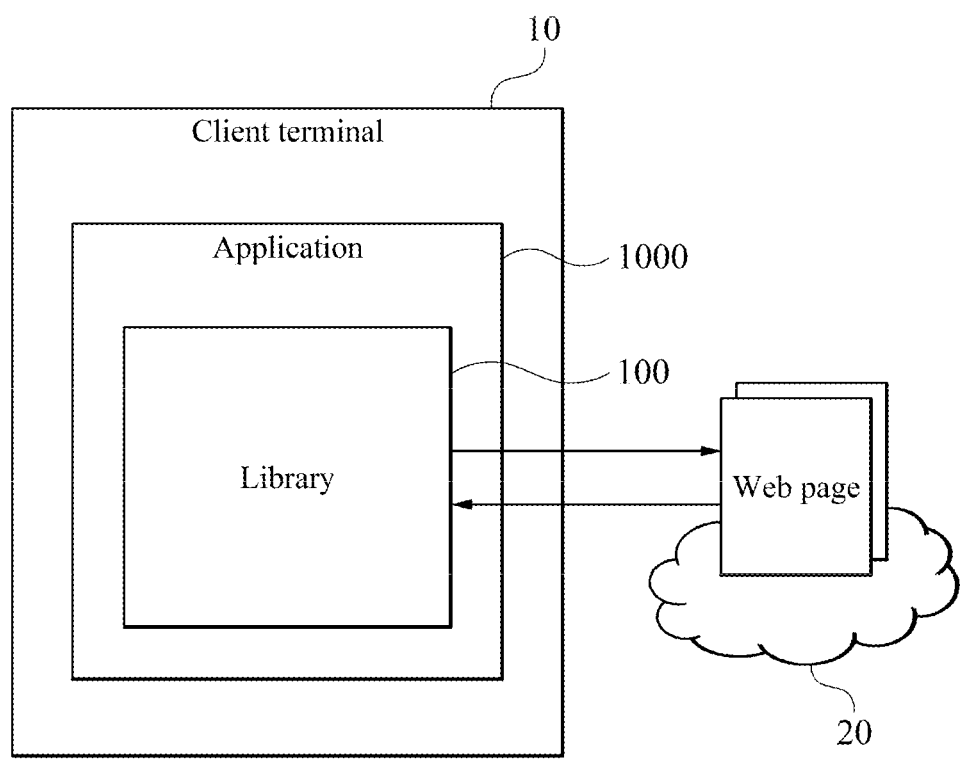
FIG. 1 is a block diagram illustrating a configuration of a system of providing a scraping-based service according to an embodiment of the disclosure.

FIG. 1 is a block diagram illustrating a configuration of a system of providing a scraping-based service according to an embodiment of the disclosure.

In an embodiment, the system may include a client terminal 10 that directly provides a service to a user and an Internet-based information providing entity 20 such as a web site, web server, or an application that provides a scraping target page.

The client terminal 10 is a means for providing an integrated service to the user by extracting necessary data of various data distributed on web sites, and may execute screen scraping.

The user installs an application 1000 that provides a service to the client terminal 10, and the application 1000 may configure a module as a library 100 in order to provide a desired function through the client terminal 10, and provide a desired service to the user.

In an embodiment, the application 1000 may configure a set of modules that execute tasks for providing a scraping-based specific service to the user as the library 100.

A specific module in the library 100 may sequentially execute processes of accessing an external web site 20, executing login or user public authentication as if the user directly uses a service of the web site 20, and obtaining data.

Hereinafter, a task executing method of the library 100 according to an embodiment will be described in more detail with reference to FIG. 2.

Figure 2:
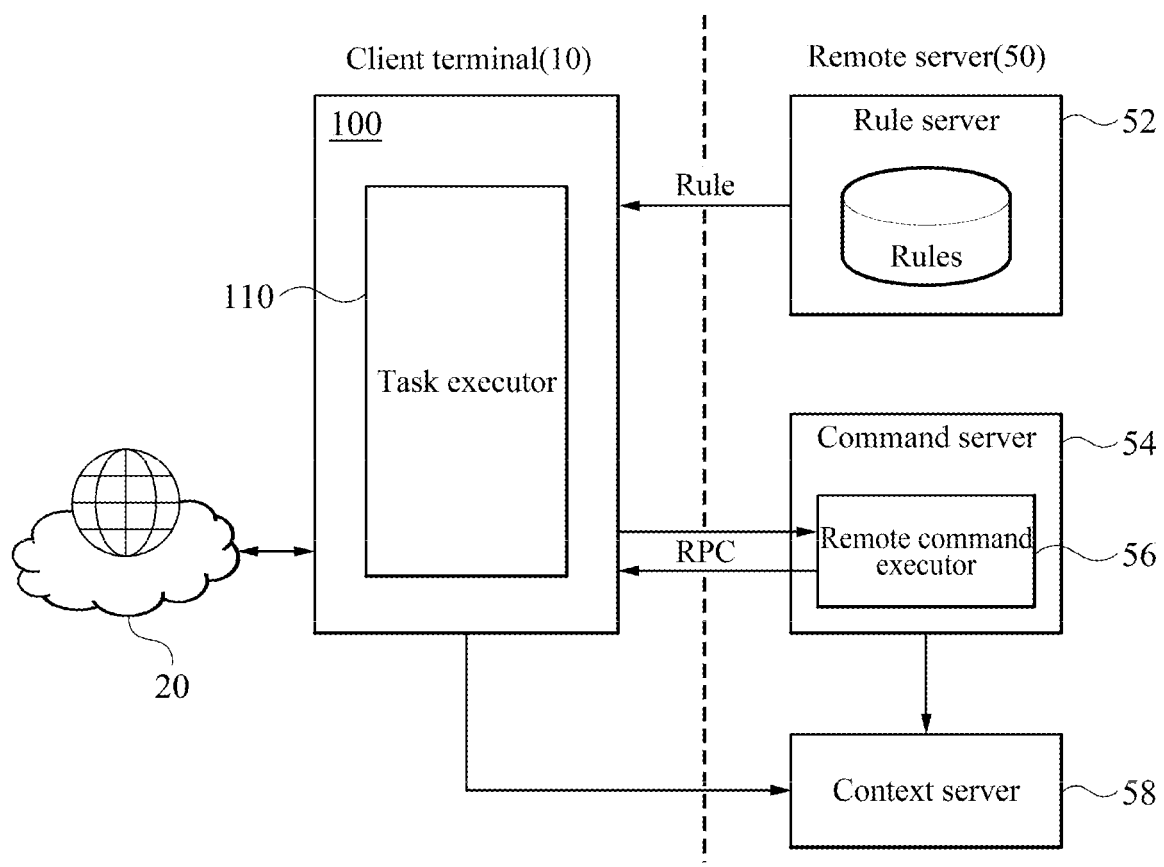
FIG. 2 is a block diagram illustrating a system including a client terminal executing scraping and a remote server providing a scraping process according to an embodiment of the disclosure.

FIG. 2 is a block diagram illustrating a system including the client terminal 10 executing scraping and a remote server 50 providing a scraping process according to an embodiment of the disclosure.

The library 100 configured on the client terminal 10 may include a task executor 110 that executes a task for scraping.

The task executor 110 accesses an external web site 20 through the Internet to transmit and receive information and scrape and collect data included in the web site 20.

The remote server 50 may provide scraping rule information RULE through communication with the client terminal 10, and directly execute commands that need to be executed remotely through a remote procedure call (RPC).

The rule information may define types and an execution order of tasks. For example, when there are tasks of A, B, C, and D, the rule information may define an execution order of the respective task as A-B-C or A-B-D.

In addition, the tasks in the rule information may be configured or reconfigured in consideration of error detection or efficiency of scraping.

For example, when the tasks are divided and configured in error message units, if an error message is received in a scraping process, it may be easier to identify a cause for which task generates an error.

Furthermore, it is also possible to layer and manage these tasks.

When the tasks are divided in error message units as described above, it may be effective in terms of error detection, but may lead to inefficiency in terms of communication. For example, transmission and reception of data to and from an external server are generated in a task execution process due to characteristics of the scraping, but it may be inefficient to receive a return of each transmission and reception result as a message.

That is, because a detailed classification of the tasks may disturb efficiency of the entire scraping, some tasks may be grouped into and managed as one upper task. For example, sequential tasks may be grouped into a predetermined number and managed as one upper task, and transmission and reception of data and corresponding results may be returned in upper task units.

In this case, when an error occurs while executing one of lower tasks belonging to the upper task, an error message may be generated in upper task units.

Accordingly, a manager may determine whether or not a specific error exists only for lower tasks belonging to the upper task to make effective execution and management of the tasks possible.

The remote server 50 may include a rule server 52, a command server 54, and a context server 58.

The rule server 52 is a device that defines tasks for scraping and a sequence of tasks as rule information in advance and stores and manages the defined rule information, and may be remotely accessed.

Accordingly, the manager may access the rule server 52 to directly modify the defined rule information, and may directly reflect a task that changes according to a change of a scraping target in the rule information.

The command server 54 may execute a specific command remotely by operating in conjunction with the client terminal 10. The command server 54 may execute the scraping according to the rule information provided by the rule server 52, but may receive a request for direct execution of a command that needs to be remotely executed and return an execution result to the client terminal 10.

That is, the commands are commands included in the task, and may be divided into a local command stored in the client terminal 10 and a remote command stored in the command server 54 according to a storage position.

The local command stored in the client terminal 10 is included and installed in the application 1000, and may be configured in the library 100. Accordingly, in general, the local command may have a static form in which it may not be modified in the client terminal 10.

On the other hand, the remote command stored in the command server 54 may be freely modified by the manager accessing the command server 54, and may have a dynamic form in which it may be customized or modified according to the purpose of the scraping.

In addition, some of the commands may be configured as test commands.

The test command may be periodically executed even though there is no user's request, and may have the same contents as those at the time of executing a scraping task according to an actual request.

Accordingly, the test command is periodically executed to periodically detect the change in the scraping target, and may determine the occurrence of an error accordingly.

The rule server 52 and the command server 54 may be managed remotely and configured independently of each other. A process executed for actual scraping in the command server 54 may not be accessed from the outside, and may be controlled only by the task defined in the rule server 52.

Accordingly, leakage of information used for a command executed remotely may be prevented, and for example, leakage of user's public authentication information or a password required for login may be prevented.

However, in an embodiment, the rule server 52 and the command server 54 may be configured and managed together in the remote server 50 except that they are physically separated and operated as separate entities.

As an example, the rule server 52 and the command server 54 may be configured as internal modules executing different tasks as devices in the remote server 50. The rule server 52 and the command server 54 may be configured and operated as a rule module and a command module, respectively, in the remote server 50, but the command module may be implemented in the remote server so that control of or access to the command module from the outside is impossible.

The context server 58 may store a value to be referenced at the time of executing the task in the command server 54.

For example, the context server 58 configures context data A.Block, B.Title, and C.Desc including task names A, B, and C, and in this case, the context data may include detailed contents such as a data value to be referenced at the time of actually executing a task.

The context server 58 stores an execution result of the command again as context data, and in this case, the contact server 58 may store the execution result as the context data in a state in which a task name including the corresponding command is given to the context data. Accordingly, when the execution result is actually stored, the execution result may be stored as context data divided for each scraping session.

The context data may be stored in the form of "task name.variable name A.Block" to decrease the possibility of conflict between variously defined variables and at the same time, allow a dependency relationship between tasks to be grasped.

For example, the manager may easily grasp from the referenced context data A.Block that the context data is a result of task A, and may grasp that some commands of task B references A.Block as a dependency relationship of task B on task A.

In addition, it is also possible to predict whether or not an infinite loop occurs due to cross reference of commands within a task through the dependency relationship and the possibility of error occurrence of the task due to the infinite loop.

In addition, the context server 58 may execute synchronization with the client terminal 10 while a session for a specific scraping is maintained, and grasp a series of operations.

While the session is maintained, the context server 58 may receive task execution result values output from the client terminal 10 and record the task execution result values as a log. The context server 58 stores the execution results as the log to allow a cause of an error to be easily grasped when an error occurs in the scraping process.

In a conventional scraping process, when an error occurs in the client terminal 10, only a result value of the error is received, and thus, it is difficult to confirm the error in detail. However, the context server 50 stores the execution results during one session in the form of the log to allow it to be easily confirmed at which step of sequential processes an error has occurred.

In addition, the context server 58 may prevent leakage of personal information obtained by scraping by stipulating that the personal information is discarded after a predetermined storage period when the personal information is included in information stored as the log.

The task executor 110 may receive the rule information from the rule server 52 and execute a task according to the rule information.

The task executor 110 may execute the task according to the received rule information, but may request the command server 54 to execute some of commands defined in the task.

The task executor 110 may transmit a remote procedure call to the command server 54 in a case of the remote command, and a remote command executor 56 of the command server 54 that has received the remote procedure call may execute the remote command and return an execution result of the remote command to the task executor 110.

The task executor 110 may execute the scraping process according to the defined rule information, and may provide collected data through the client terminal 10.

A series of data exchanged in a communication process between the client terminal 10 and the remote server 50 described above may be compressed, encrypted and then transmitted/received between the client terminal 10 and the remote server 50.

Data obtained in the scraping process may include personal information, mainly uses information of the web site 20, and may thus be configured in the form of a hypertext markup language (HTML) document.

Accordingly, by first compressing and encrypting a repeated character string in the HTML document, compression efficiency may be increased and at the same time, a size of the encrypted data may be decreased to decrease an encryption time.

Furthermore, by encrypting the included personal information, damage due to the leakage of the personal information may be prevented.

Hereinafter, operations between the client terminal 10 and the rule server 52 will be described in more detail with reference to FIG. 3.

Figure 3:
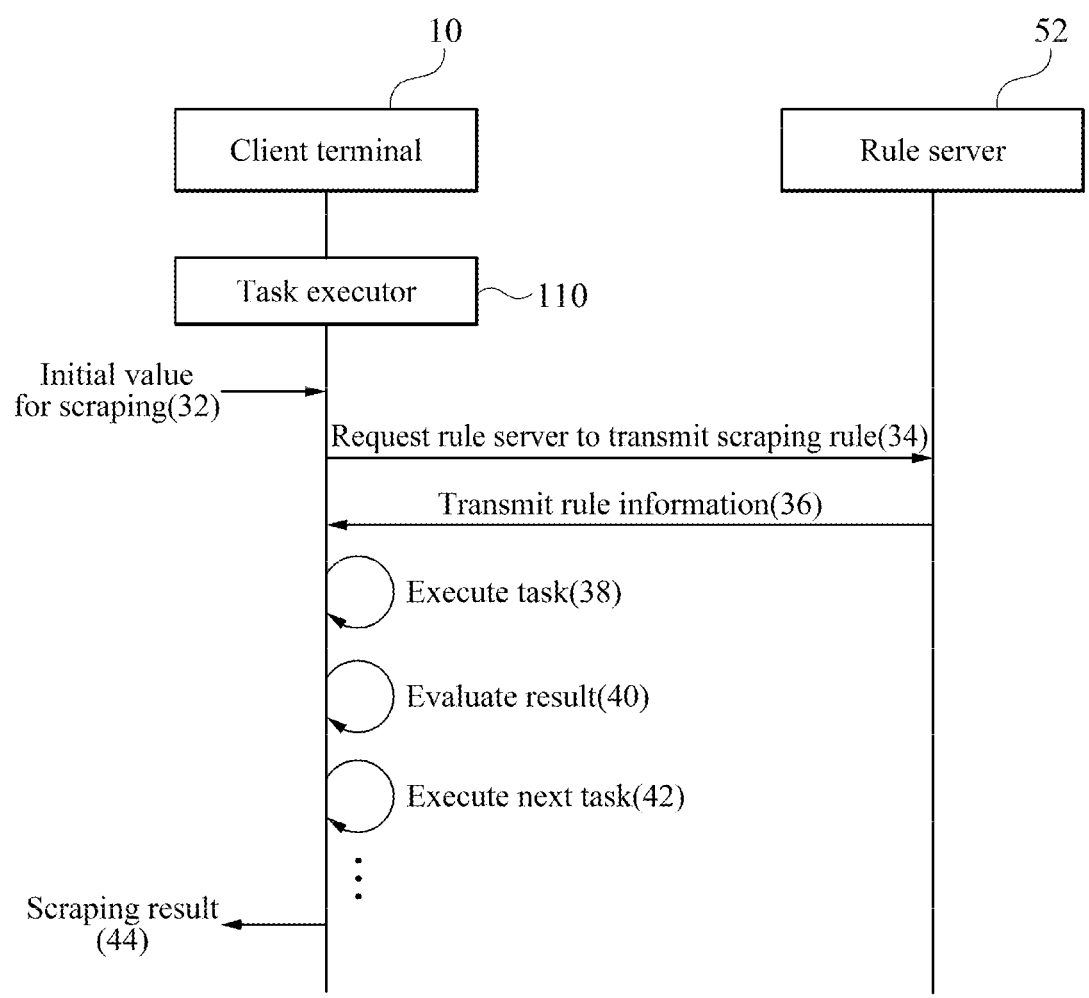
FIG. 3 is a sequence diagram illustrating a process of requesting rule information between the client terminal and a rule server according to an embodiment of the disclosure.

FIG. 3 is a sequence diagram illustrating a process of requesting rule information between the client terminal 10 and the rule server 52.

First, the application 1000 installed in the client terminal 10 may request scraping when it is necessary to obtain data from an external web site during an operation.

In this case, the client terminal 10 provides an initial value for scraping to the task executor 110 (32).

The initial value for scraping is identification information for scraping, and may include various information required for scraping, such as uniform resource locator (URL) information of a scraping target web site and authentication information required for obtaining data.

In addition, the initial value for scraping may also include information defining a format or a type of data to be obtained.

The task executor 110 requests the rule server to transmit a scraping rule for scraping, using the initial value for scraping (34).

The rule server 52 transmits a matched scraping rule of stored rules according to the received initial value as rule information (36).

The task executor 110 that has received the rule information executes a series of tasks defined in the rule information. The task executor 110 may select the most preferential task in the rule information and execute the most preferential task (38).

In this case, each task may be executed as a block including a plurality of commands according to a detailed purpose for scraping, and the task executor 110 may evaluate an execution result whenever execution of each task is completed (40).

The task executor 110 executes the next task in the rule information when there is no abnormality in the execution result.

The processes described above may be repeatedly executed, all tasks defined in the rule information may be executed, and obtained data may be provided to the client terminal as a scraping result (44).

Figure 4:
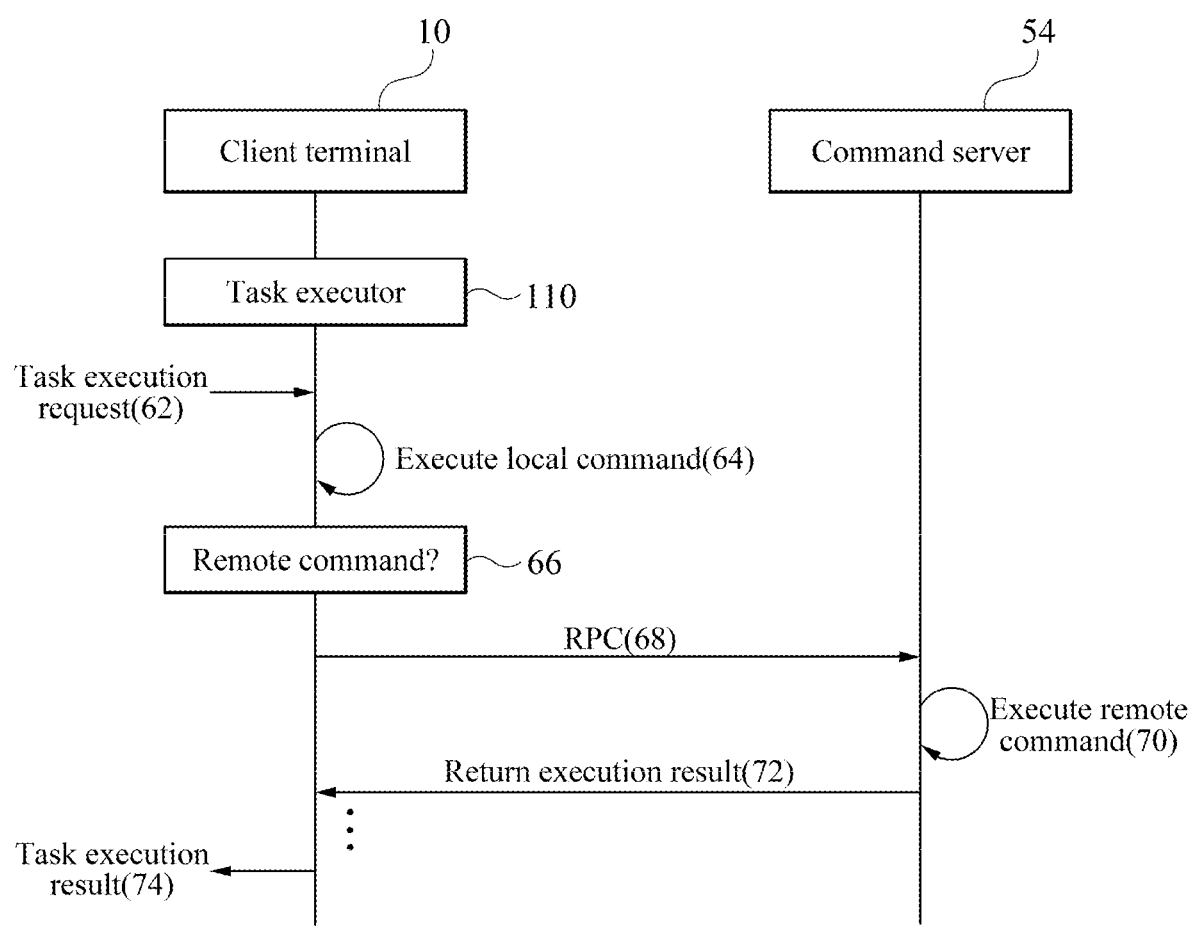
FIG. 4 is a sequence diagram illustrating a task execution process of the client terminal according to an embodiment of the disclosure.

Hereinafter, a detailed task execution process of the task executor 110 will be described with reference to FIG. 4. In an embodiment, a task may include a plurality of commands.

In this case, the commands may be divided into a local command that may be directly executed by the client terminal and a remote command that should be executed through the external remote server.

Accordingly, the task executor 110 may receive a task execution request (62), and may select and execute a command that is to be executed preferentially.

When the command that is to be executed is a local command, the local command may be executed on the client terminal (64).

When execution of a specific command is completed, it may be determined whether a command that is to be executed next is a local command or a remote command.

When the next command is the remote command (66), the task executor 110 may transmit a remote procedure call to the command server (68).

The remote procedure call may include information defining contents of a command required for remote execution, and the command server 54 may execute the remote command through the remote procedure call.

The command server 54 returns an execution result to the client terminal after executing the remote command (72).

The processes described above may be repeated until all the commands of the task are executed, and when the execution of the command is completed, a task execution result may be provided to the client terminal (74).

In an embodiment, the task may include a combination of the local command and the remote command, and the client terminal 10 may repeatedly execute a process of transmitting the remote procedure call to the command server 54 and receiving a return of a result according to characteristics of the command.

Hereinafter, processes of a scraping method according to an embodiment will be described in more detail with reference to FIG. 5.

Figure 5:
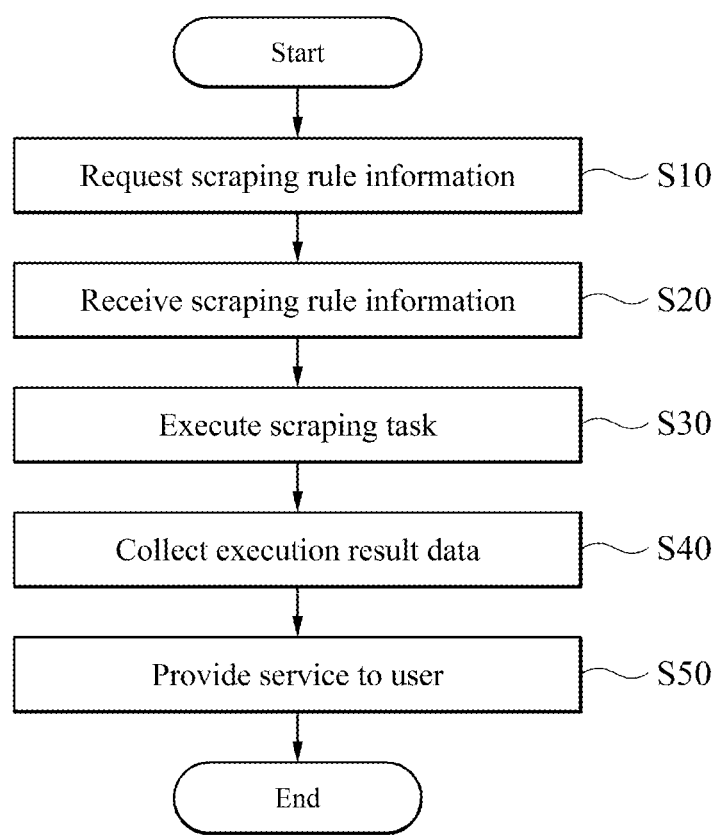
FIG. 5 is a flow chart illustrating a method in which an application executes a scraping service on the client terminal according to an embodiment of the disclosure.

FIG. 5 is a flow chart illustrating a method in which an application executes a scraping service on the client terminal according to an embodiment of the disclosure.

First, when scraping for an external web site is required, the application may request scraping rule information (S10).

The application 1000 may request the rule information by transmitting an initial value for scraping to the rule server 52 through a communication module of the client terminal 10.

When the rule information is requested, the rule server 52 may search for rule information defining a matched scraping process and transmit the rule information to the client terminal 10.

In this case, the rule information may be selected from a predetermined list, or when matched rule information does not exist, the rule server 52 may also configure a task through a combination of basic commands and generate the task as the rule information.

In addition, the rule information may also be generated and provided by dividing a local command executable by the client terminal 10 and a remote command executable by the command server 54 according to an execution entity.

Furthermore, the rule information may be modified or newly generated through external access of an authorized manager, in addition to being configured in advance by a combination of basic commands.

That is, when there is a change in a specific web site, which is a scraping target, the rule information may be modified to correspond to the change.

Accordingly, as compared with a hard coding method in which the scraping rule is defined as a library in the application, the manager may actively cope with the scraping target, and the user may use existing services without updating the application.

The client terminal 10 receives the scraping rule information from the rule server 52 (S20).

The task executor 110 in the client terminal 10 executes a plurality of tasks defined in the received rule information as described above (S30).

The tasks may be sequentially executed, and may be executed with reference to results of previously executed tasks with correlation therebetween.

A currently executed task may generate a result with reference to execution results of the previous tasks using a task name and related variables defined in the rule information.

The task includes a plurality of commands, and a task result generated through an execution process of the commands may be stored for each task.

In addition, the commands may be divided into a local command and a remote command, and may be processed in a distributed manner in the client terminal and the command server, respectively.

The respective commands may be processed in an asynchronous polling manner.

Accordingly, the client terminal 10 may execute the command within a predetermined protocol, but may request the command server to execute the remote command by a remote procedure call when the command is the remote command. The command server 54 may execute the remote command when it receives the remote procedure call.

In addition, the scraping method according to an embodiment is an asynchronous method, and a delay may occur in the execution of the task according to the number of remote commands configured in the task.

Because the remote command increases the number of remote procedure calls and the number of times of reception of returned results, the execution of the task may be delayed according to a communication state, and it may be necessary to wait for execution of other local commands until a result of the remote command is received.

Accordingly, in the scraping method according to an embodiment, a manner of temporarily transferring the control right of the task executor 110 to the command server 54 in consideration of a command configuration in the task may be used.

Figure 6:
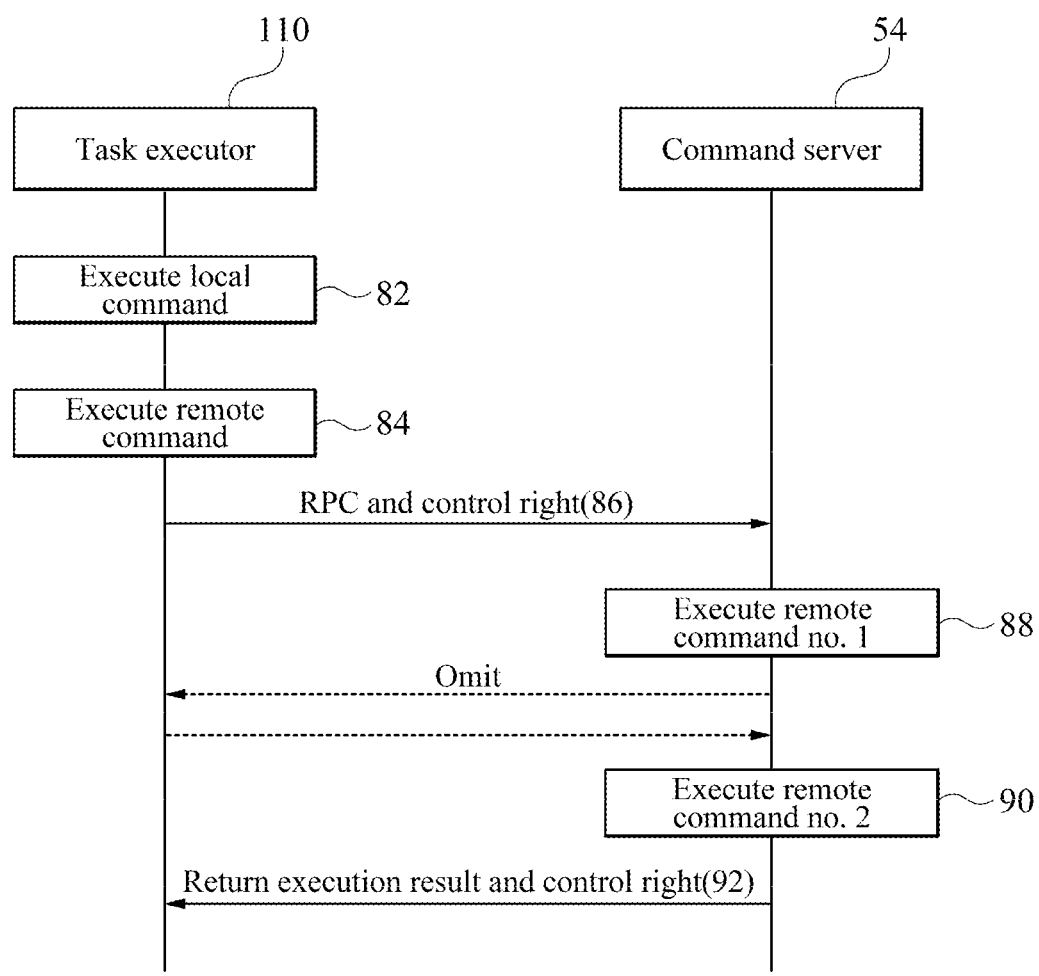
FIG. 6 is a sequence diagram illustrating a task execution process of the client terminal according to an embodiment of the disclosure.

In this regard, referring to FIG. 6, the task executor 110 may determine whether a command that is to be executed is locally or remotely executed, and at the same time, may additionally determine whether or not the remote commands are continuous.

The task executor 110 may execute the local command (82), but may transfer the control right of the execution of the command to the command server 54 when the remote commands are continuous according to an execution schedule of the tasks.

Accordingly, the command server 54 that has obtained the control right may omit a repetitive process of returning a result to the client terminal 10 whenever the remote command is executed and receiving a new remote procedure call.

That is, the successive remote commands may be executed without receiving separate remote procedure calls (88 and 90). Accordingly, a waiting time from the transmission of the remote procedure call to the return of the result may be decreased.

Through the processes described above, when the continuous remote commands are executed, the command server may transfer the control right back to the task executor together with a return of an execution result (92).

In addition, in the scraping method according to an embodiment, scraping is executed in task units, and scraping efficiency may be increased by executing the tasks in parallel in consideration of a variable reference relationship of the tasks.

As described above, it is possible to grasp the dependence relationship between the tasks according to whether or not the commands within the tasks are referenced, and it is also possible to enable faster and more efficient scraping using the dependency relationship in this case.

The task executor 110 may allow independent tasks in which input variables and output variables between tasks are not related to each other to be simultaneously executed in parallel regardless of an order according to the rule information in consideration of an execution process of all tasks.

Figure 7A:
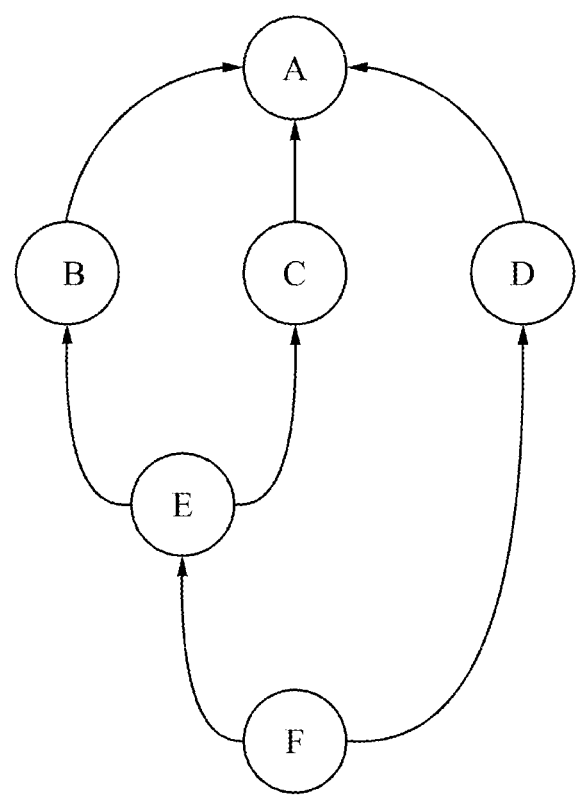
FIGS. 7a and 7b are diagrams illustrating a relationship between and an execution order of tasks according to an embodiment of the disclosure.

For example, the dependency relationship between the tasks defined in the rule information may be expressed as a dependency graph as illustrated in FIG. 7a. In this case, respective nodes of the graph refer to tasks, and links connecting the nodes to each other and arrows of the links may define reference directions of the tasks.

In a case of FIG. 7a, tasks B, C, and D may reference an execution result of task A, and task E may reference execution results of tasks B and C. Task F references execution results of task E and task D at the same time.

Accordingly, the task executor 110 may determine an execution order of the tasks in consideration of a dependency relationship for an optimized operation at the time of actually executing the tasks even though the manager creates codes so that tasks A, B, C, D, E, and F are sequentially executed at the time of generating actual rule information.

Specifically, according to the dependency relationship, tasks B, C, and D independently reference a result of task A and do not reference each other, and thus, the task executor 110 may simultaneously execute tasks B, C, and D to enable a faster and more efficient scraping work. That is, the task executor 110 may simultaneously execute tasks B, C, and D in parallel at the time of actually executing tasks B, C, and D even though tasks B, C, and D have been sequentially defined in the rule information.

In addition, it is also possible for the rule server 52 to grasp the dependency relationship between the tasks in advance, determine an actual execution order of the tasks, and provide the actual execution order to the client terminal 10.

Figure 7B:
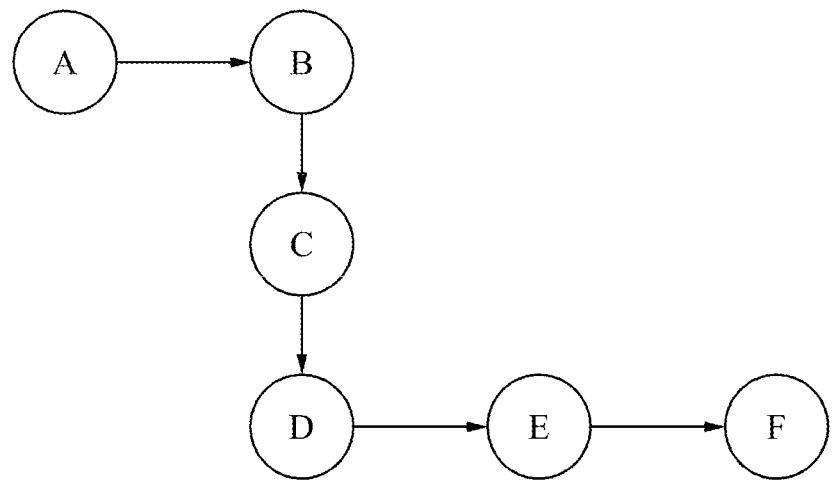

Accordingly, the rule server 52 may extract a sequence graph that redefines the execution order of the rule information tasks through the dependency relationship between the tasks defined as illustrated in FIG. 7a in the form illustrated in FIG. 7b.

Referring to FIG. 7b, the sequence graph may define an execution order of tasks that need to be sequentially executed through links in a horizontal direction, and may define a relationship between tasks that may be simultaneously executed in parallel through links in a vertical direction.

Accordingly, the rule server 52 may redefine the execution order of the tasks in the form of the sequence graph and provide the redefined execution order to the client terminal 10 to allow tasks B, C, and D to be simultaneously executed after task A is executed, thereby increasing efficiency of the entire scraping.

When the execution of the scraping tasks described above is completed, data is collected from the external web site of the application as a result of the execution (S40).

The collected data may be provided according to a service requested by the user through the application 1000 (S50).

Figure 8:
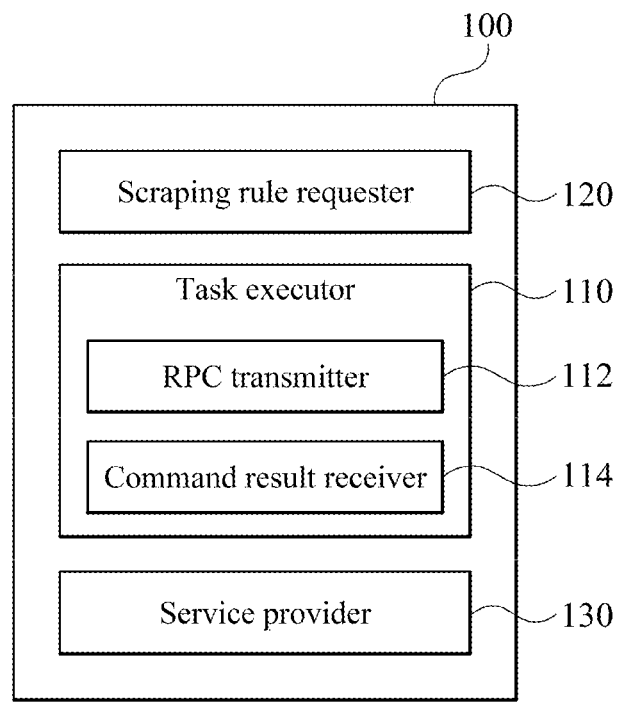
FIG. 8 is a block diagram illustrating a configuration of an application according to an embodiment of the disclosure.

Hereinafter, a configuration of the library within the application according to an embodiment of the disclosure will be described with reference to FIG. 8.

As an embodiment, the application is an application program (or application software) installed and driven on the client terminal, and is implemented to operate in conjunction with the rule server and the command server.

The library 100 within the application may include a scraping rule requester 120, the task executor 110, and a service provider 130.

The scraping rule requester 120 may request the rule server 52 to transmit rule information for scraping.

That is, in an embodiment, the application is implemented in a manner of externally storing and managing a process for scraping in the separate rule server 52 rather than a manner (hard coding manner) of internally storing the process for scraping in advance for each target web site.

Accordingly, it is possible to actively cope with changes in the scraping target and cope with the changes in the scraping target by changing only the rule information in the rule server without needing to redistribute a separate application.

The task executor 110 may execute the task using the rule information received from the scraping rule requester 120.

Specifically, the task may include a combination of commands, and may include a local commands and a remote command.

The local command is a command directly executed by the client terminal, for example, a basically generated command, and may be generated in advance in the rule server.

For example, a command for requesting a hypertext transfer protocol (HTTP) request/response and a user input and executing an HTTP login request/response or the like may be generated as the local command.

The remote command is a command executed through the command server, and may be customized according to requested external data.

For example, through a customized remote command, the command server may generate a hash key in response to a public certificate and execute a task that requires additional processing such as requesting an information page based on a custom page.

When update of a page in the target web site is generated, it may be configured as a custom page and a corresponding command may be remotely executed.

The task executor 110 may further include a remote procedure call (RPC) transmitter 112 requesting a remote procedure call in order to execute the remote command and a command result receiver 114 receiving an execution result of the remote command.

The service provider 130 processes data collected by the task executor 110 described above and provides the processed data to the user.

As described above, according to the disclosure, by providing the scraping service through the client terminal and the remote server in a distributed manner, it is possible to increase efficiency of the scraping task and actively cope with the changes in the scraping target.

In addition, it is possible to increase use convenience of the user by minimizing the update or the redistribution of the application in response to the change of the scraping target.

Further, it is possible to increase security by operating the remote server executing the scraping independently from the client terminal and prevent external access to and leakage of information used for executing the scraping.

Hereinabove, various embodiments described herein may be implemented within a non-transitory computer-readable recording medium using, for example, software, hardware, or a combination thereof.

According to a hardware implementation, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for executing other functions. In some cases, embodiments described herein may be implemented as a control module itself.

According to a software implementation, embodiments such as procedures and functions described herein may be implemented as separate software modules. Each of the software modules may execute one or more functions and operations described herein. A software code may be implemented as a software application written in a suitable programming language. The software code may be stored in a memory module and executed by a control module.

The technical spirit of the disclosure has been described only by way of example hereinabove, and the disclosure may be variously modified, altered, and substituted by those skilled in the art to which the disclosure pertains without departing from essential features of the disclosure.

Accordingly, embodiments disclosed in the disclosure and the accompanying drawings are provided in order to describe the technical spirit of the disclosure rather than limiting the technical spirit of the disclosure, and the scope of the disclosure is not limited by these embodiments and the accompanying drawings. The scope of the disclosure should be interpreted by the following claims, and it should be interpreted that all spirits equivalent to the following claims fall within the scope of the disclosure.

The invention claimed is:

1. A system for providing a scraping-based service comprising:
   a client terminal including a task executor configured to request and receive rule information for scraping and obtain external data by executing tasks within the rule information; and
   a remote server including a rule server configured to manage the rule information and transmit the rule information according to the request from the client terminal, a command server configured to execute a command according to a remote procedure call received from the client terminal and return an execution result of the command, and a context server configured to record task result values according to the rule information as log information,
   wherein the rule information includes information defining a type and an execution order of the tasks,
   the tasks are configured in the rule information in error message units for error detection, and some independent tasks are executed in parallel according to a predefined dependency relationship with reference to context data values including task names and variable names at the time of executing the tasks,
   the command is a command included in the task, and includes a local command executable by the client terminal, a remote command executed through the remote server, and a test command periodically executing verification, and
   the remote command has a dynamic form in which it is modifiable through the command server.

2. The system for providing a scraping-based service of claim 1, wherein the task executor is configured to collect the external data by executing a plurality of commands constituting the task defined in the rule information on the client terminal or the command server.

3. The system for providing a scraping-based service of claim 1, wherein the obtained external data is compressed and then encrypted within a hypertext markup language (HTML) document.

4. The system for providing a scraping-based service of claim 1, wherein the task executor includes:
   a remote procedure call (RPC) transmitter configured to transmit a remote procedure call to the remote server in order to execute the remote command; and
   a command result receiver configured to receive a return of an execution result of the task executed according to the remote procedure call.

5. The system for providing a scraping-based service of claim 1, wherein the task executor is configured to:
   verify an execution result of the executed task for execution of each task, and
   request modification of the rule information or a remote procedure call for the command when there is an abnormality in the execution of the task.

6. The system for providing a scraping-based service of claim 1, wherein the tasks are executed in block units, such that execution results of commands in the tasks are stored in blocks, and
   execution results of the tasks are referenced using task names and related variables at the time of referencing the tasks.

7. The system for providing a scraping-based service of claim 1, wherein the local command and the remote command are executed in a distributed manner through the client terminal or the remote server, and
   the task is asynchronously polled.

8. The system for providing a scraping-based service of claim 1, wherein the task executor is configured to transmit an initial value for scraping to the rule server, and
   the rule server is configured to transmit a matched scraping rule of stored rules according to the received initial value as the rule information to the client terminal.

9. The system for providing a scraping-based service of claim 1, when the remote command is continuous for more than a predetermined number of times according to an execution schedule of the task, the remote server receives a control right for controlling command execution from the client terminal, and continually executes the remote command.

10. A remote server for providing a scraping-based service comprising:
   a rule server configured to manage rule information for scraping and transmit the rule information according to a request from a client terminal;
   a command server configured to execute a command according to a remote procedure call received from the client terminal and return an execution result of the command; and
   a context server configured to record task result values according to the rule information as log information,
   wherein the rule information includes information defining a type and an execution order of tasks,
   the tasks are configured in the rule information in error message units for error detection, and some independent tasks are executed in parallel according to a predefined dependency relationship with reference to context data values including task names and variable names at the time of executing the tasks,
   the command is a command included in the task, and includes a local command executable by the client terminal, a remote command executed through the remote server, and a test command periodically executing verification, and
   the remote command has a dynamic form in which it is modifiable through the command server.

11. The remote server for providing a scraping-based service of claim 10, wherein the rule server is configured to receive an initial value for scraping from the client terminal and transmit a matched scraping rule of stored rules according to the received initial value as the rule information to the client terminal.

12. The remote server for providing a scraping-based service of claim 10, when the remote command is continuous for more than a predetermined number of times according to an execution schedule of the task, the remote server receives a control right for controlling command execution from the client terminal, and continually executes the remote command.

\* \* \* \* \*